(12) United States Patent
Hales et al.

(10) Patent No.: US 8,116,944 B2
(45) Date of Patent: Feb. 14, 2012

(54) SYSTEMS AND METHODS INVOLVING TORQUE DISTURBANCE REJECTION

(75) Inventors: Michael K. Hales, Midland, MI (US);
William H. Wittig, Saginaw, MI (US);
Anthony J. Champagne, Saginaw, MI (US)

(73) Assignee: Nexteer (Beijing) Technology O., Ltd.

( * ) Notice: Subject to any disclaimer, the term of this patent is extended or adjusted under 35 U.S.C. 154(b) by 961 days.

(21) Appl. No.: 12/110,670

(22) Filed: Apr. 28, 2008

(65) Prior Publication Data
US 2009/0271075 A1    Oct. 29, 2009

(51) Int. Cl.
*G06F 19/00* (2011.01)
(52) U.S. Cl. ............... 701/41; 701/42; 701/44
(58) Field of Classification Search ............. 701/41–44
See application file for complete search history.

(56) References Cited

U.S. PATENT DOCUMENTS

| | | | |
|---|---|---|---|
| 5,920,160 A * | 7/1999 | Yamada et al. ............... 318/9 |
| 6,122,579 A * | 9/2000 | Collier-Hallman et al. .... 701/41 |
| 6,240,350 B1 * | 5/2001 | Endo ............... 701/41 |
| 6,360,151 B1 * | 3/2002 | Suzuki et al. ............... 701/41 |
| 6,370,459 B1 * | 4/2002 | Phillips ............... 701/41 |
| 6,845,309 B2 * | 1/2005 | Recker et al. ............... 701/41 |
| 6,999,862 B2 * | 2/2006 | Tamaizumi et al. ............ 701/41 |
| 7,382,295 B2 * | 6/2008 | Otsuka et al. ............... 341/116 |
| 2001/0002631 A1 * | 6/2001 | Okanoue et al. ............... 180/446 |

FOREIGN PATENT DOCUMENTS

| | | |
|---|---|---|
| EP | 1302385 A2 | 4/2003 |
| EP | 1759956 A1 | 3/2007 |
| EP | 1884447 A1 | 2/2008 |
| EP | 2100797 A1 | 9/2009 |

OTHER PUBLICATIONS

European Search Report and Office Action dated Mar. 4, 2010 for European Application No. 09158145.4.

* cited by examiner

*Primary Examiner* — Hussein A. Elchanti
(74) *Attorney, Agent, or Firm* — Cantor Colburn LLP

(57) ABSTRACT

A method for controlling a steering system, the method including, receiving a first signal including a position of a component in the steering system, receiving a second signal including a disturbance signal operative to indicate an effect of a first torque disturbance in the steering system, calculating a first counter acting torque command signal operative to minimize the first torque disturbance as a function of the position of the component and the disturbance signal, and sending the first counter acting torque command signal to a motor.

16 Claims, 7 Drawing Sheets

US 8,116,944 B2

SYSTEMS AND METHODS INVOLVING TORQUE DISTURBANCE REJECTION

BACKGROUND

Power steering systems in vehicles are used to generate forces that assist a driver when steering a vehicle. For example, when a driver applies torque to a handwheel, the steering system generates forces that assist turning of the handwheel by the driver. The position of the handwheel and other components in the steering system may affect the amount of torque a driver uses to turn the handwheel. As a handwheel turns, undesirable tactile vibrations (torque disturbances) may be felt at the handwheel by the driver. Methods and systems that minimize torque disturbances felt at the handwheel by a driver are desired.

SUMMARY

The above described and other features are exemplified by the following Figures and Description in which a power steering system is disclosed that includes:

A method for controlling a steering system, the method including, receiving a first signal including a position of a component in the steering system, receiving a second signal including a disturbance signal operative to indicate an effect of a first torque disturbance in the steering system, calculating a first counter acting torque command signal operative to minimize the first torque disturbance as a function of the position of the component and the disturbance signal, and sending the first counter acting torque command signal to a motor.

An alternate method for controlling a steering system, the method including, receiving a first signal including a position of a component in the steering system, calculating a reference signal responsive to receiving the first signal, receiving a second signal including a disturbance signal operative to indicate an effect of a first torque disturbance in the steering system, calculating a cancelation torque signal operative to minimize the first torque disturbance as a function of the reference signal and the disturbance signal, and sending the cancelation torque signal to a motor.

A power steering system comprising a motor mechanically linked to a wheel, and a processor operative to receive a first signal including a position of the motor in the steering system, calculate a reference signal responsive to receiving the first signal, receive a second signal including a disturbance signal operative to indicate an effect of a first torque disturbance in the steering system, calculate a cancelation torque signal operative to minimize the first torque disturbance as a function of the reference signal and the disturbance signal, and send the cancelation torque signal to the motor.

BRIEF DESCRIPTION OF THE DRAWINGS

Referring now to the Figures wherein like elements are numbered alike.

DETAILED DESCRIPTION

In power steering systems, a driver applies torque to a handwheel to change a direction of wheels of a vehicle. The steering system provides an assist torque that aids the driver in turning the handwheel. The handwheel is mechanically linked to wheels of the vehicle via motors, gears, and shafts. As the handwheel turns, the direction of the wheels of the vehicle changes. In some steering systems, as the driver turns the handwheel, the position of components in the system impart torque variations that are felt as vibrations by the driver at the handwheel. Torque variations may be caused by, for example, linkages in the system such as universal or Cardan Joints and gears. Motors in the steering system may also cause torque variations associated with a position of the motor. The torque variations caused by components may be periodic, occurring in multiples of the component rotation.

The systems and methods described below minimize torque variations associated with component position that are felt by a driver.

Figure 1:
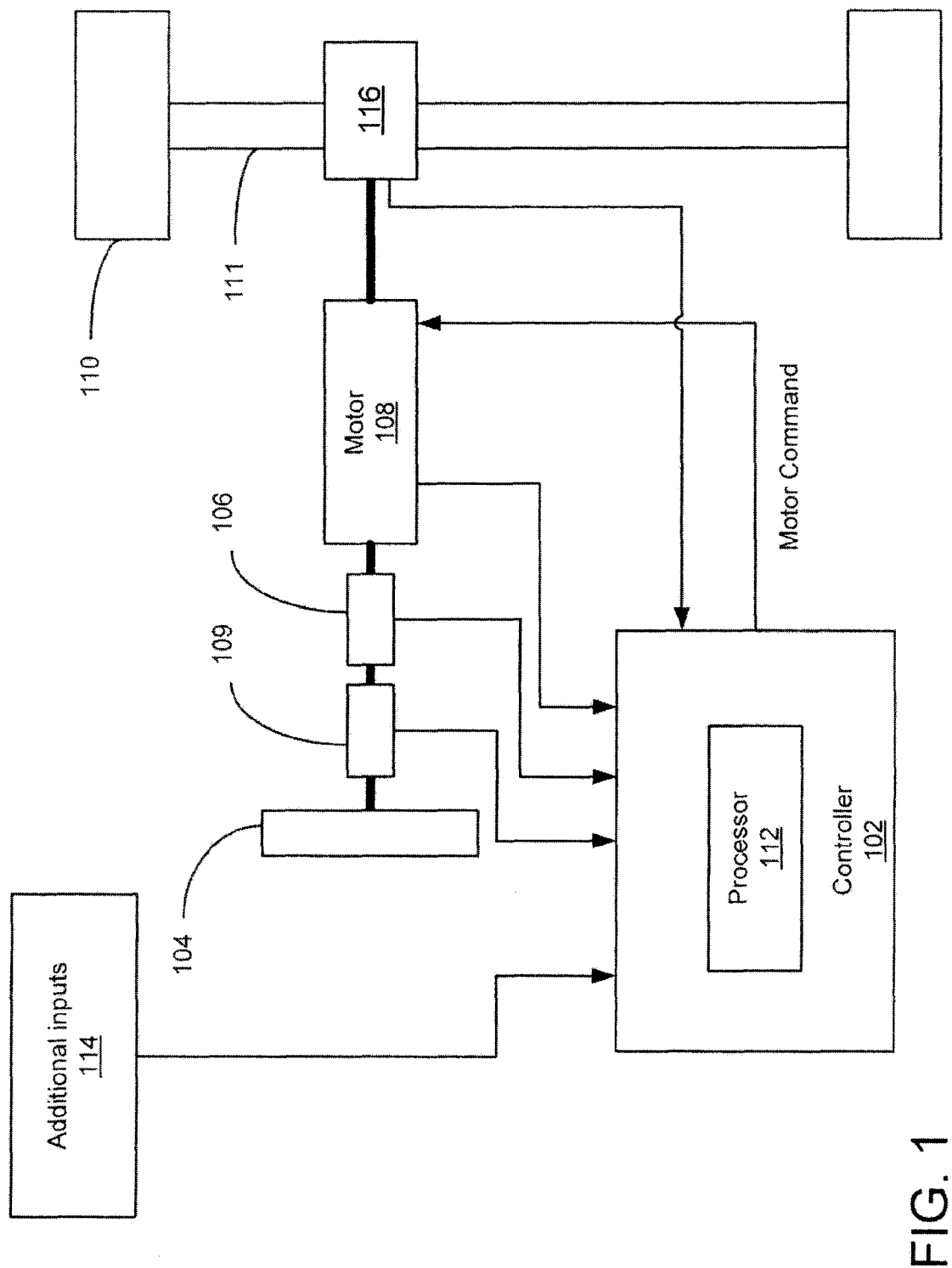
FIG. 1 illustrates an exemplary embodiment of a power steering system.

FIG. 1 illustrates an exemplary embodiment of a power steering control system. The system includes a hand wheel 104 connected to a motor 108. A torque sensor 106 may be disposed between the hand wheel 104 and the motor 108. A hand wheel position sensor 109 may be connected to the hand wheel 104. The motor 108 is connected to wheels 110 via, for example, a rack 111 or other suitable linkage. A controller 102 including a processor 112 is communicatively linked to the torque sensor 106, the motor 108, the hand wheel position sensor 109, and a rack position sensor 116. The controller 102 is also communicatively linked to additional inputs 114 that may include, for example, positions and velocities of components in the system and inputs that indicate disturbances and torque variations in the system.

In operation, the controller 102 receives torque signals from the torque sensor 106 that indicate the amount of torque a user has imposed on the hand wheel 104. The controller 102 processes the torque signals and motor position signals received from the motor 108, and sends motor commands to the motor 108. The motor 108 turns the wheels 110 via the rack 111. The controller 102 may also use the additional inputs 114 to scale the motor commands to the motor 108. Scaling the commands to the motor 108 results in a power steering system that offers smooth tactile feedback to the user, and turns the wheels 110 more effectively in a variety of driving conditions.

Torque disturbances are often caused by a position of components in the steering system. For example, the motor 108 may impart one or more harmonic torque disturbances on the system. The torque disturbance has an order equal to the number of times the disturbance occurs per revolution of the motor 108. For exemplary purposes a motor will be used to describe the methods of operation of the steering system. Other components, such as, for example, linkages, joints, and gears may also impart torque disturbances on the system based on their positions. The methods described below may be used to minimize the torque disturbances in any component of the system and are not limited to torque disturbances caused by motors.

The harmonic torque disturbances may be mathematically represented and graphically illustrated. Sinusoidal waves matching the order of the torque disturbance may be calculated that minimize or cancel the torque disturbance. The calculated waves may be used to calculate a cancel torque signal that minimizes or cancels the torque disturbance felt by the user at the handwheel 104.

Figure 2:
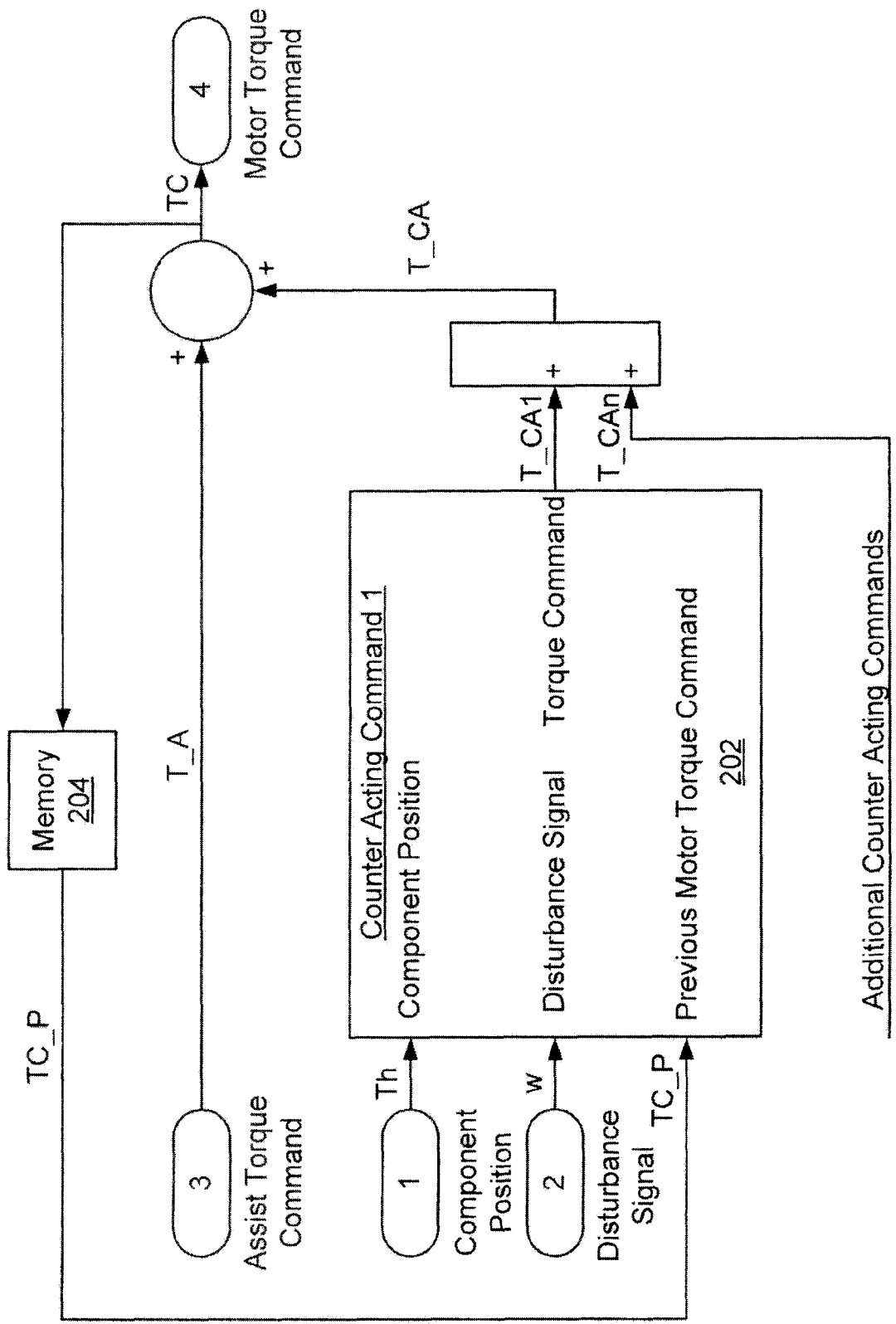
FIG. 2 illustrates an exemplary embodiment of a block diagram of a control system of the power steering system of FIG. 1.

FIG. 2 illustrates a block diagram of an exemplary method for minimizing torque disturbances. The method may be executed by the processor 112 (of FIG. 1). For exemplary purposes the motor 108 will be used as a non-limiting example of a system component that imparts a torque disturbance in the system.

In this regard, a component position signal 1 representing a position of the motor 108, and a disturbance signal 2, such as, for example, a velocity of the motor 108 are received in block 202. A previous motor torque command signal (TC_P) may be received from a memory 204. A first counter acting torque command (T_CA1) is computed as a periodic function of the component position signal 1, the disturbance signal 2, and the previous motor torque command signal (TC_P). The first counter acting torque command (T_CA1) may be added to an assist torque command 3 to result in a motor torque command signal 4 that is sent to the motor 108. Additional counter acting commands (T_CAn) may be added to result in a total counter acting torque command (T_CA). The additional counter acting commands are computed using a similar method as shown in block 202. The additional counter acting commands (T_CAn) may minimize harmonic orders of torque disturbances in the motor 108 that are not minimized by the first counter acting torque command (T_CA1), or torque disturbances from other components in the system.

A non-limiting example of a function used to calculate the first counter acting torque command (T_CA1) is T_CA1=A sin(Nθ+φ), where A is an amplitude of the torque command, N is a frequency of the torque command, and φ is a phase offset of the torque command.

Figure 3:
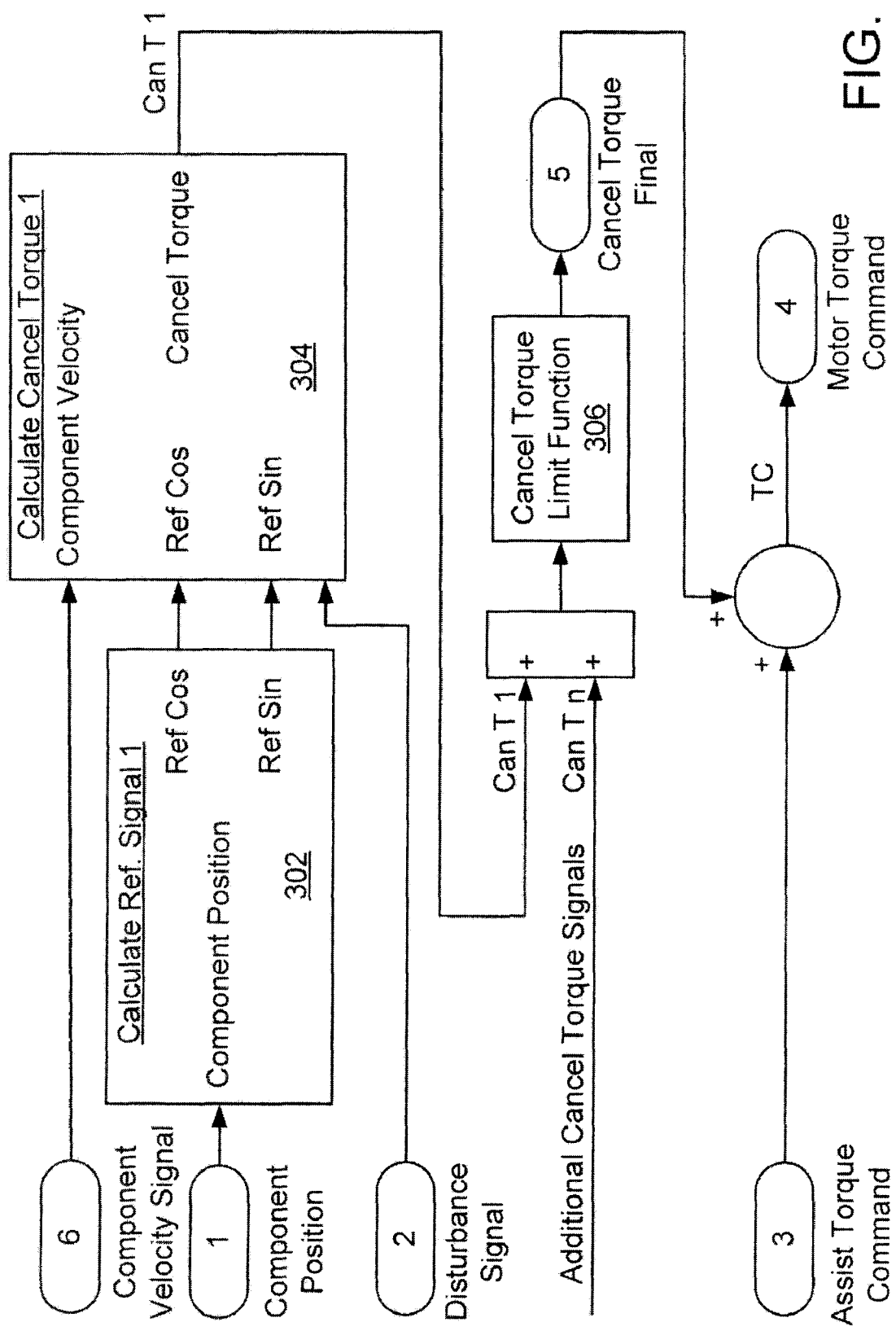
FIGS. 3-6 illustrate alternate exemplary embodiments of a block diagram of a control system of the power steering system of FIG. 1.

FIG. 3 illustrates a block diagram of an alternate embodiment of exemplary method for minimizing torque disturbances. In block 302 the component position signal 1 is received, and a reference signal 1 is calculated as a function of the component position signal 1. The calculation results in a reference cosine (Ref Cos) signal and a reference sine (Ref Sin) signal that are filtered, and when combined, minimize or cancel the component position signal. The disturbance signal 2 is received in block 304 where a first cancel torque signal (Can T 1) is calculated as a function of the disturbance signal 2 and the Ref Cos and Ref Sin. The first cancel torque signal (Can T 1) may be added to additional cancel torque signals (Can T n). The additional cancel torque commands (Can T n) may be used to minimize additional torque disturbances caused by different harmonic orders of disturbances in the same component, or torque disturbances in other components. A resultant cancel torque final signal 5 may be limited by a cancel torque limit function in block 306 that will be described further below. The cancel torque final signal 5 may be added to the assist torque command 3 to result in the motor torque command signal 4 that is sent to the motor 108.

Figure 4:
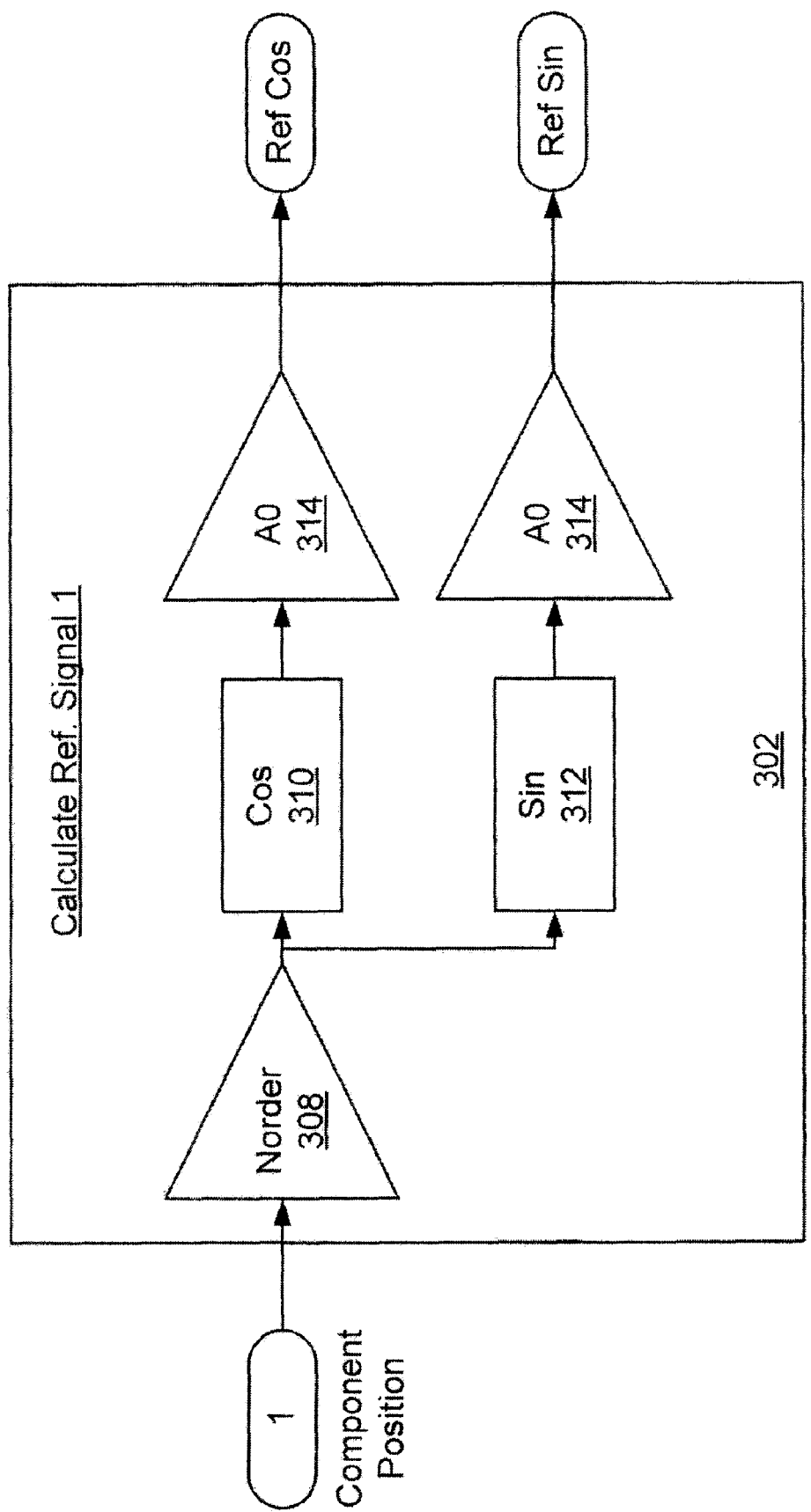

FIG. 4 further illustrates the calculate reference signal 1 of block 302. The component position signal 1 is received. In block 308, the harmonic order of the torque disturbance is determined. For example, if a motor experiences a torque disturbance three times per revolution of the motor, the torque disturbance is a third order disturbance. Once the order of the disturbance is known, a sinusoidal wave comprising the addition of a cosine component 310 and a sine component 312 is calculated. In blocks 314 scaling factors may be used to scale the cosine component 310 and the sine component 312.

Figure 5:
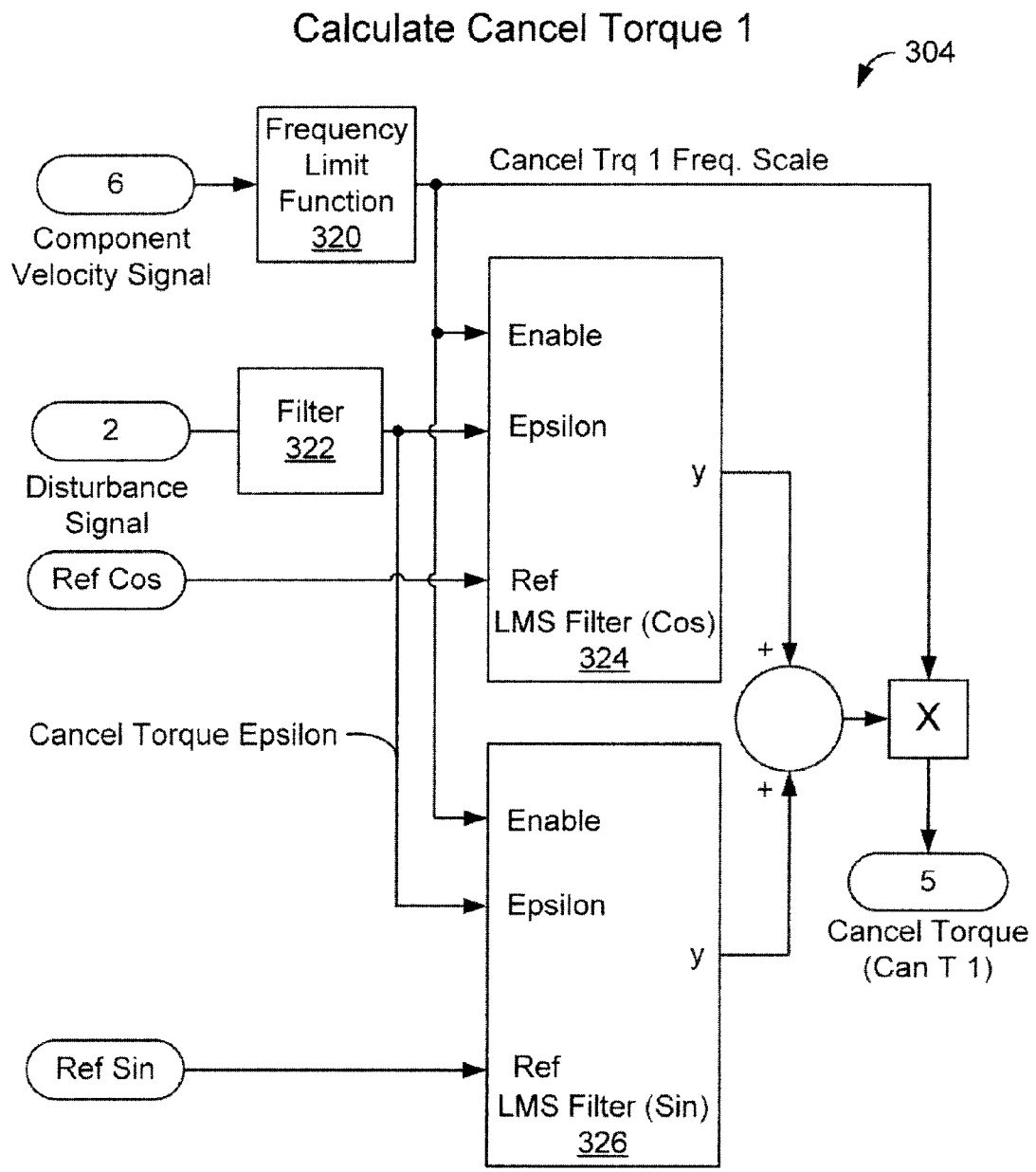

FIG. 5 further illustrates the calculate cancel torque 1 of block 302. The disturbance signal 2 may be filtered in block 322. The filter may include, for example, a high pass, low pass, or band pass filter. The filtered disturbance signal 1 (Epsilon) and the Ref Cos signal are used as inputs to a least mean square filter function in block 324. The LMS filter coefficients are adapted to minimize Epsilon by adjusting the amplitude and phase of the reference Cos signal that is used to help cancel the torque disturbance. Block 326 adjusts the LMS filter coefficients to filter the reference Sin signal in a similar manner to the LMS filter of block 324. The outputs (y) of blocks 324 and 326 are added resulting in the cancel torque signal (Can T1).

The disturbance signal 2 is indicative of a torque disturbance. For example a third order torque disturbance in the motor 108 may be determined by the processor 112 by sampling the sensed velocity or torque of the motor 108. The sampling rate of the processor 112 may limit the effectiveness of the calculated disturbance signal resulting in aliasing of the disturbance. For example, if the sampling rate for the disturbance signal 2 is 500 Hz, and the velocity of the motor is sufficiently high, the third order torque disturbance signal will be improperly represented, resulting in undesirable aliasing of the disturbance signal. The frequency limit function in block 320 receives a component velocity signal 6, and prevents negative effects of aliasing from influencing the cancel torque signal 5.

Figure 6:
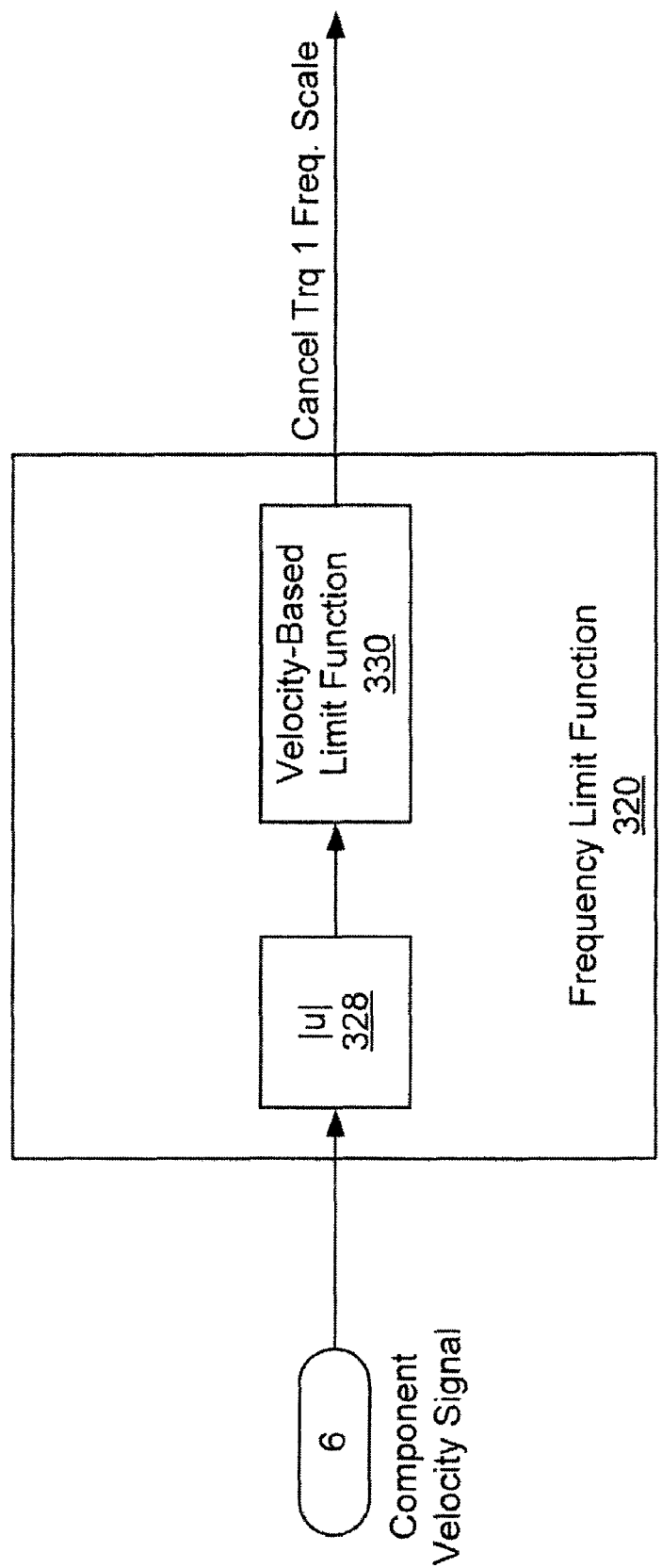

FIG. 6 further illustrates the frequency limit function in block 320. An absolute value of the component velocity signal 6 may be taken in block 328. In block 330 a velocity based limit function is applied to the disturbance signal 2 to calculate a cancel torque 1 frequency scaling signal.

Figure 7:
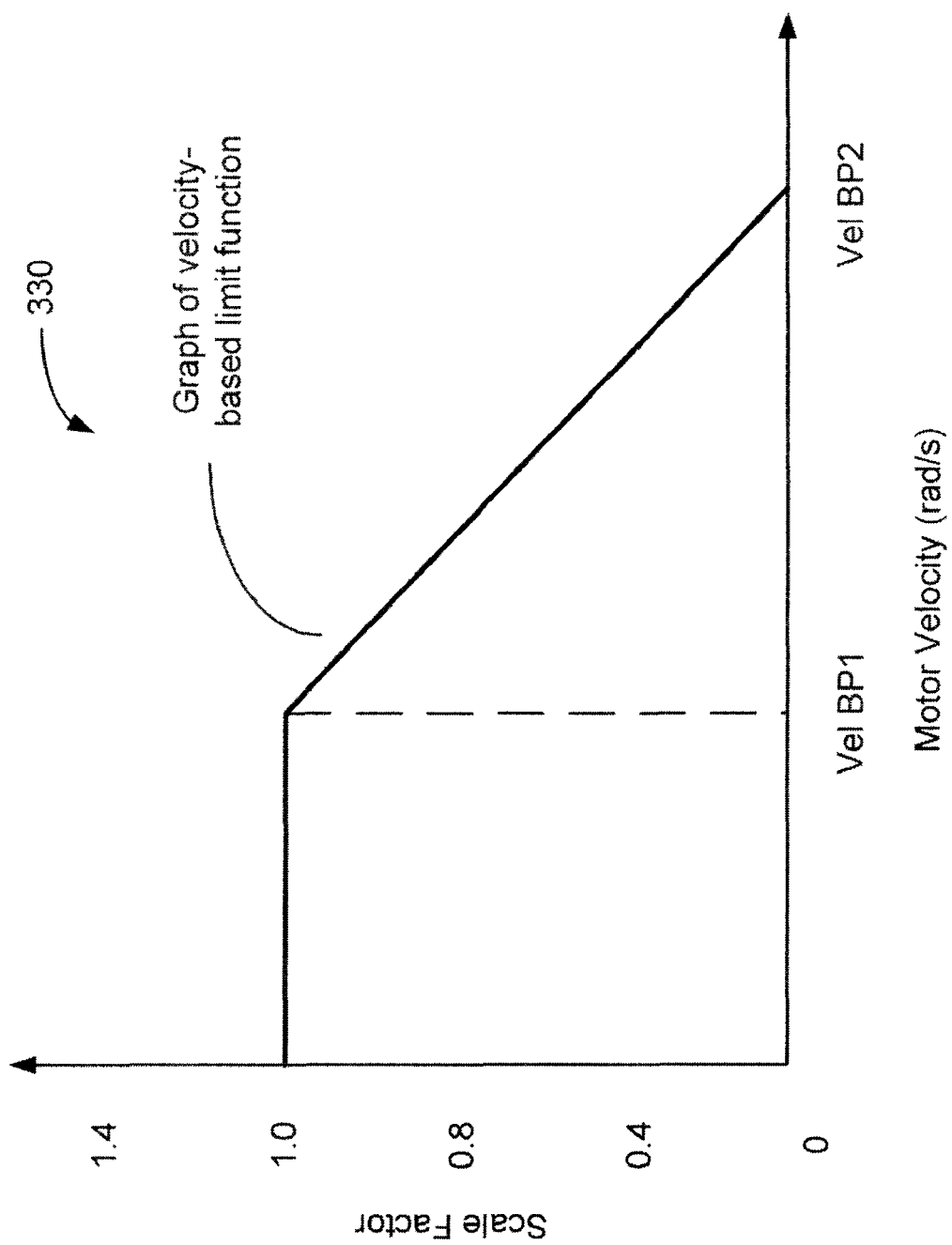
FIG. 7 illustrates an exemplary embodiment of a graph of a velocity-based limit function of FIG. 6.

FIG. 7 illustrates an exemplary embodiment of a velocity-based limit function 330. A graph of the velocity-based limit function is shown graphically where the y-axis represents a scaling factor and the x-axis represents a motor velocity in rad/s. The scaling factor equals 1 until the motor velocity equals a first break point velocity (Vel BP1). The scaling factor decreases to equal 0 when the motor velocity equals a second break point velocity (Vel BP2). The first break point velocity may defined by the following example function: Vel BP1=2π*MaxFreq/NOrder, where the MaxFreq is the maximum useful frequency of the disturbance signal and NOrder is the harmonic order of the torque disturbance. Vel BP2=1.1*Vel BP1.

In the illustrated embodiment of FIG. 5, the cancel torque frequency scaling signal may be used as an enable input to the LMS filters 324 and 326. The enable input is used to scale the LMS filter convergence coefficient. The convergence coefficient of the LMS filters 324 and 326 defines the rate of updates of the filter coefficients of the LMS filters 324 and 326. A convergence coefficient of 0 results in no updates to the filter coefficients of the LMS filters 324 and 326, while a convergence coefficient larger than 0 results in the filter coefficients being update. Larger values of convergence coefficients results in faster filter coefficient updates. In operation, the cancel torque frequency scaling signal may be multiplied by the convergence coefficient to scale the value of the convergence coefficient used in the LMS filters 324 and 326. Scaling the convergence coefficient used in the LMS filters 324 and 326 results in the processing by the LMS filters 324 and 326 being determined as a function of the frequency limit function 320.

FIG. 5 also illustrates that the cancel torque frequency scaling signal may be multiplied by the cancel torque signal (Can T1) to scale the cancel torque signal (Can T1) as a function of motor velocity (component velocity).

The technical effects and benefits of the system and methods described above allow torque disturbances of one or more components of a steering system to be minimized or canceled using sinusoidal signals. The sinusoidal signals are used to generate a cancel torque signal that is combined with a motor torque command to minimize torque disturbances felt by a user at a handwheel.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method for controlling a steering system, the method including:
   receiving a first signal including a position of a component in the steering system;
   receiving a second signal including a disturbance signal operative to indicate an effect of a first torque disturbance in the steering system;
   calculating a first counter acting torque command signal operative to minimize the first torque disturbance as a function of the position of the component and the disturbance signal; and
   sending the first counter acting torque command signal to a motor, wherein the first counter acting torque command signal equals=A $\sin(N\theta+\phi)$, where A is an amplitude of the torque command, N is a frequency of the torque command, and $\phi$ is a phase offset of the torque command.

2. The method of claim 1, wherein the method further includes adding the first counter acting torque command signal to an assist torque command responsive to calculating the first counter acting torque command signal.

3. The method of claim 1, wherein the calculating a first counter acting torque command signal further comprises calculating a function of a previous counteracting torque command.

4. A method for controlling a steering system, the method including:
   receiving a first signal including a position of a component in the steering system;
   calculating a reference signal responsive to receiving the first signal;
   receiving a second signal including a disturbance signal operative to indicate an effect of a first torque disturbance in the steering system;
   calculating a cancelation torque signal operative to minimize the first torque disturbance as a function of the reference signal and the disturbance signal; and
   sending the cancelation torque signal to a motor, wherein the reference signal is calculated by:
   determining a periodic order of the first torque disturbance;
   generating a sinusoidal signal having the same periodic order of the first torque disturbance operative to minimize the first torque disturbance; and
   defining the reference signal as the sinusoidal signal.

5. The method of claim 4, wherein the function of the reference signal and the disturbance signal includes a least mean square (LMS) filter.

6. The method of claim 4, wherein the method further includes adding the cancelation torque signal to an assist torque command responsive to calculating the cancelation torque signal.

7. A method for controlling a steering system, the method including:
   receiving a first signal including a position of a component in the steering system;
   calculating a reference signal responsive to receiving the first signal;
   receiving a second signal including a disturbance signal operative to indicate an effect of a first torque disturbance in the steering system;
   calculating a cancelation torque signal operative to minimize the first torque disturbance as a function of the reference signal and the disturbance signal; and
   sending the cancelation torque signal to a motor, wherein the reference signal is calculated by:
   determining a periodic order of the first torque disturbance;
   generating a sinusoidal signal having the same periodic order of the first torque disturbance operative to minimize the first torque disturbance;
   multiplying the sinusoidal signal with a scaling function defined by an estimated amplitude of the first torque disturbance; and
   defining the reference signal as the sinusoidal signal.

8. A method for controlling a steering system, the method including:
   receiving a first signal including a position of a component in the steering system;
   calculating a reference signal responsive to receiving the first signal;
   receiving a second signal including a disturbance signal operative to indicate an effect of a first torque disturbance in the steering system;
   calculating a cancelation torque signal operative to minimize the first torque disturbance as a function of the reference signal and the disturbance signal; and
   sending the cancelation torque signal to a motor, wherein the function of the reference signal and the disturbance signal includes:
   a first filter operative to filter the disturbance signal;
   a first LMS filter associated with a cosine component of the reference signal operative to calculate a cosine component of the cancel torque signal as a function of the filtered disturbance signal and the cosine component of the reference signal;
   a second LMS filter associated with a sine component of the reference signal operative to calculate a sine component of the cancel torque signal as a function of the filtered disturbance signal and the sine component of the reference signal; and
   adding the cosine component of the cancel torque signal and the sine component of the cancel torque signal to define the cancelation torque signal.

9. The method of claim 8, wherein method further includes:
   calculating a cancelation torque scaling signal responsive to receiving a velocity signal as a function of the velocity signal;
   multiplying the cancelation torque scaling signal with a convergence coefficient of the first and second LMS filters resulting in a scaled convergence coefficient.

10. A method for controlling a steering system, the method including:
    receiving a first signal including a position of a component in the steering system;

calculating a reference signal responsive to receiving the first signal;
receiving a second signal including a disturbance signal operative to indicate an effect of a first torque disturbance in the steering system;
calculating a cancelation torque signal operative to minimize the first torque disturbance as a function of the reference signal and the disturbance signal; and
sending the cancelation torque signal to a motor, wherein the disturbance signal is a rotational velocity and the cancelation torque scaling signal is defined as a function of a first velocity defined as $2\pi$ multiplied by a maximum frequency of the disturbance signal divided by a periodic order of the first torque disturbance and a second velocity defined as a constant value multiplied by the first velocity.

11. A power steering system comprising:
a motor mechanically linked to a wheel; and
a processor operative to receive a first signal including a position of the motor in the steering system, calculate a reference signal responsive to receiving the first signal, receive a second signal including a disturbance signal operative to indicate an effect of a first torque disturbance in the steering system, calculate a cancelation torque signal operative to minimize the first torque disturbance as a function of the reference signal and the disturbance signal, and send the cancelation torque signal to the motor, wherein the processor is operative to calculate the reference signal by:
determining a periodic order of the first torque disturbance;
generating a sinusoidal signal having the same periodic order of the first torque disturbance operative to minimize the first torque disturbance; and
defining the reference signal as the sinusoidal signal.

12. The method of claim 11, wherein the function of the reference signal and the disturbance signal includes a least mean square (LMS) filter.

13. The method of claim 11, wherein the processor is further operative to calculate a cancelation torque scaling signal responsive to receiving the velocity signal as a function of the velocity signal, and multiply the cancelation torque signal with the cancelation torque scaling signal.

14. A power steering system comprising:
a motor mechanically linked to a wheel; and
a processor operative to receive a first signal including a position of the motor in the steering system, calculate a reference signal responsive to receiving the first signal, receive a second signal including a disturbance signal operative to indicate an effect of a first torque disturbance in the steering system, calculate a cancelation torque signal operative to minimize the first torque disturbance as a function of the reference signal and the disturbance signal, and send the cancelation torque signal to the motor, wherein the processor is operative to calculate the reference signal by:
determining a periodic order of the first torque disturbance;
generating a sinusoidal signal having the same periodic order of the first torque disturbance operative to minimize the first torque disturbance;
multiplying the sinusoidal signal with a scaling function defined by an estimated amplitude of the first torque disturbance; and
defining the reference signal as the sinusoidal signal.

15. A power steering system comprising:
a motor mechanically linked to a wheel; and
a processor operative to receive a first signal including a position of the motor in the steering system, calculate a reference signal responsive to receiving the first signal, receive a second signal including a disturbance signal operative to indicate an effect of a first torque disturbance in the steering system, calculate a cancelation torque signal operative to minimize the first torque disturbance as a function of the reference signal and the disturbance signal, and send the cancelation torque signal to the motor, wherein the function of the reference signal and the disturbance signal includes:
a first filter operative to filter the disturbance signal;
a first LMS filter associated with a cosine component of the reference signal operative to calculate a cosine component of the cancel torque signal as a function of the filtered disturbance signal and the cosine component of the reference signal;
a second LMS filter associated with a sine component of the reference signal operative to calculate a sine component of the cancel torque signal as a function of the filtered disturbance signal and the sine component of the reference signal; and
adding the cosine component of the cancel torque signal and the sine component of the cancel torque signal to define the cancelation torque signal.

16. A power steering system comprising:
a motor mechanically linked to a wheel; and
a processor operative to receive a first signal including a position of the motor in the steering system, calculate a reference signal responsive to receiving the first signal, receive a second signal including a disturbance signal operative to indicate an effect of a first torque disturbance in the steering system, calculate a cancelation torque signal operative to minimize the first torque disturbance as a function of the reference signal and the disturbance signal, and send the cancelation torque signal to the motor, wherein the processor is further operative to calculate a cancelation torque scaling signal responsive to receiving the velocity signal as a function of the velocity signal, multiplying the cancelation torque scaling signal with a convergence coefficient of the first and second LMS filters resulting in a scaled convergence coefficient.

* * * * *